R. J. BENNETT.
PLAYING ATTACHMENT FOR AUTOMATIC MUSICAL INSTRUMENTS.
APPLICATION FILED MAY 3, 1910.
1,107,572.
Patented Aug. 18, 1914.
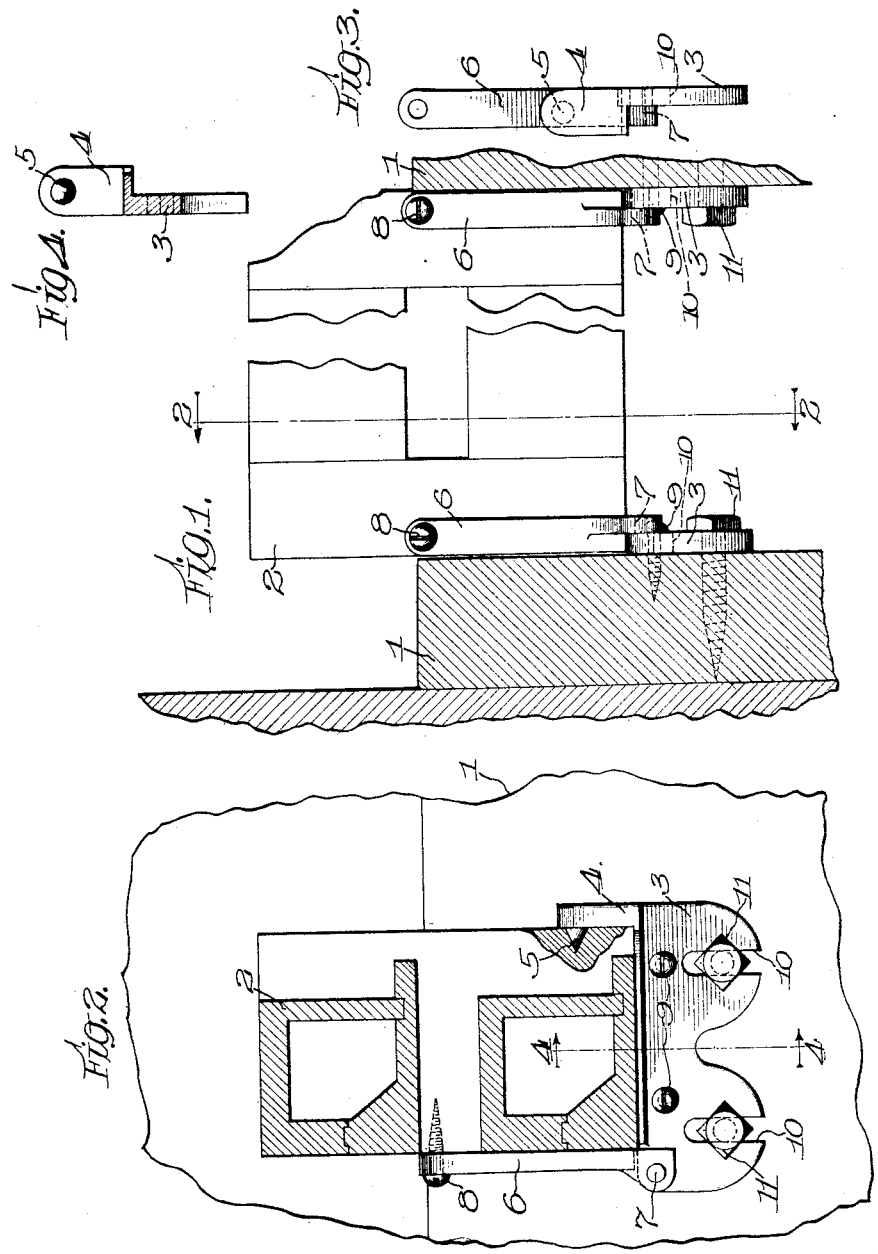
Witnesses:
G. W. Dumarus Jr.
A. O. Knight.
Inventor:
Robert J. Bennett
By: Dumont & Hopkins
Attys.

UNITED STATES PATENT OFFICE.

ROBERT J. BENNETT, OF MOLINE, ILLINOIS, ASSIGNOR TO ARTISTA PIANO PLAYER COMPANY, OF MILAN, ILLINOIS, A CORPORATION OF ILLINOIS.

PLAYING ATTACHMENT FOR AUTOMATIC MUSICAL INSTRUMENTS.

1,107,572.     Specification of Letters Patent.     Patented Aug. 18, 1914.

Application filed May 3, 1910. Serial No. 559,179.

*To all whom it may concern:*

Be it known that I, ROBERT J. BENNETT, a citizen of the United States, residing at Moline, in the county of Rock Island and State of Illinois, have invented certain new and useful Improvements in Playing Attachments for Automatic Musical Instruments, of which the following is a full, clear, and exact specification.

This invention relates to automatic musical instruments in which the automatic portion of the instrument depends upon communication being established between suitable motor devices ordinarily known as pneumatics, and a wind chest or trunk which is ordinarily supported across the instrument in such a position that while it does not interfere with hand operation of the instrument, it very often obstructs the strings, tuning keys, or other parts of the instrument so that when it becomes necessary to have access to these parts, the wind chest or trunk must be removed. These improvements have more particular reference to devices for the support of the wind chest or trunk, and the primary object is to provide means whereby such trunk or chest may be securely held in place when in use, and readily detached when desired.

With a view to the attainment of these ends and the accomplishment of certain other objects which will hereinafter appear, the invention consists in certain features of novelty in the construction, combination and arrangement of parts disclosed herein, an example of the invention being shown in the accompanying drawing, and the invention being particularly pointed out in the claims.

In the said drawings—Figure 1 is a front view of the wind chest or chests showing one end thereof supported in the cabinet or case of the instrument by means of this invention. Fig. 2 is a cross section on the line 2—2 of Fig. 1. Fig. 3 is a rear elevation of the supporting bracket and Fig. 4 is a cross section thereof on the line 4—4 of Fig. 2, the wind chest being removed.

The numeral 1 designates a part of the case or cabinet of a musical instrument, and 2 is the wind chest or trunk, the particular example shown in the drawing being the double type. This wind chest or trunk, as is well understood in the art, usually extends across the entire front of the instrument, and when the instrument is a piano, it ordinarily crosses substantially all of the strings and covers parts of the instrument to which access is desired from time to time. Against each side 1 of the case or cabinet is secured a bracket 3, upon which the ends of the wind chest or trunk 2 rest when in position. Rising from the back or inner end of each of these brackets is a post 4 which carries a centering point 5 arranged to engage in a corresponding socket in the back of the wind chest, the point 5 being preferably conical, so that when the wind chest has been removed and then replaced, it will readily find its proper position on the brackets when its sockets are engaged with the points 5. The front end of each bracket is provided with a hinged arm 6 pivoted thereto at 7, and these arms are provided with screws 8 or other suitable means whereby they may be secured to the front side of the wind chest so that when the screws 8 are in place, the wind chest will be firmly clamped in position on the brackets. When it is desired to remove the wind chest, it is simply necessary to remove the screws 8, whereupon the arms 6 may be turned down into a position flush with the upper edge of the brackets, permitting the wind chest to be withdrawn outwardly from the points 5. The brackets 3 may be held in place by suitable means, such as screws 9, but when once secured in place, it will seldom, if ever, be necessary to remove them. In order, however, that they may be nicely adjusted, they are provided with slots 10 through which lag bolts 11 are screwed into the case 1 for holding the brackets temporarily and adjustably until the position of the wind chest is accurately determined, whereupon the lag bolts are tightened up and the permanent screws 9 are put in place.

What I claim is:

1. In a device for the purpose described, the combination of a bracket and support therefor, a wind chest resting upon the bracket, a post rising from the bracket and carrying a centering point engaging the wind chest, and an arm hinged to the bracket and detachably secured to the wind chest.

2. In a device for the purpose described, the combination of a bracket and support therefor, a wind chest resting upon the bracket, a stop rising from the bracket and carrying a centering element engaging the wind chest, an arm hinged to the bracket and coöperating with the stop for holding the chest in position, said arm being movable with respect to the bracket and in directions toward and away from the stop and means for securing the said arm against movement.

3. The combination of a support, a bracket secured thereto, a wind trunk resting upon said bracket, a member upstanding from said bracket, and a hinged clamping member for clamping the wind-chest between said clamping member and the upstanding member.

4. The combination of a support, a bracket adjustably mounted thereon, a wind trunk resting upon said bracket, a member upstanding from said bracket and having a centering pin engaging the side of the wind trunk, and a clamping member pivoted on said bracket and adapted to clamp the wind trunk against said up-standing member and said centering pin.

5. The combination of a support, a bracket adjustably mounted thereon, a wind trunk resting upon said bracket, a member upstanding from said bracket and having a centering pin engaging the side of the wind trunk, a clamping member pivoted on said bracket and adapted to clamp the wind trunk against said upstanding member and said centering pin, and means for fastening said pivoted clamping member to said wind trunk.

In testimony whereof I have signed my name to this specification, in the presence of two subscribing witnesses, on this 18th day of April A. D. 1910.

ROBERT J. BENNETT.

Witnesses:
M. W. CANTWELL,
FRANCIS A. HOPKINS.

---

Copies of this patent may be obtained for five cents each, by addressing the "Commissioner of Patents, Washington, D. C."